US006818088B2

(12) United States Patent
Lee

(10) Patent No.: US 6,818,088 B2
(45) Date of Patent: Nov. 16, 2004

(54) APPARATUS TO FABRICATE PHOTOSENSITIVE DRUM FOR IMAGE FORMING APPARATUS AND METHOD THEREOF

(75) Inventor: Jin-Soo Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 182 days.

(21) Appl. No.: 10/197,506

(22) Filed: Jul. 18, 2002

(65) Prior Publication Data

US 2003/0155068 A1 Aug. 21, 2003

(30) Foreign Application Priority Data

Feb. 19, 2002 (KR) ................................ 10-2002-0008757

(51) Int. Cl.[7] ................................................ B32B 31/00

(52) U.S. Cl. ....................... 156/187; 156/188; 156/190; 156/192; 156/248; 156/257; 156/268; 156/270; 156/446; 156/458; 156/517; 156/521; 242/445; 242/526; 242/527; 242/911; 242/900

(58) Field of Search ................................ 156/458, 521, 156/DIG. 11, 188, 187, 190, 192, 248, 257, 268, 270, 353, 446, 517; 242/911, 900, 445, 526, 527; 83/875

(56) References Cited

U.S. PATENT DOCUMENTS

| | | | | | |
|---|---|---|---|---|---|
| 3,547,724 | A | * | 12/1970 | Zagusta | 156/233 |
| 4,849,043 | A | * | 7/1989 | Instance | 156/227 |
| 5,651,851 | A | * | 7/1997 | Gatcomb | 156/250 |
| 6,485,878 | B2 | * | 11/2002 | Nagase et al. | 430/124 |
| 2003/0206752 | A1 | * | 11/2003 | Hosoya et al. | 399/237 |

* cited by examiner

*Primary Examiner*—Linda L Gray
(74) *Attorney, Agent, or Firm*—Staas & Halsey LLP

(57) ABSTRACT

An apparatus and method to fabricate a photosensitive drum for an image forming apparatus. The apparatus includes a photosensitive belt supply roll and a double-sided tape supply roll; a bonding unit to bond a photosensitive belt and a double-sided tape together; a cutting unit to cut the bonded photosensitive belt and double-sided tape at a predetermined length from a double-sided tape cover; a rotating unit to rotate the cut photosensitive belt and double-sided tape around a rotary drum having a predetermined size; and a winding unit to wind the double-sided tape cover which is separated from the photosensitive belt and the double-sided tape. An inexpensive photosensitive belt is wound on a large-sized rotary drum by applying tension. Thus, it is possible to mass-produce the photosensitive drum at a low cost.

22 Claims, 5 Drawing Sheets

APPARATUS TO FABRICATE PHOTOSENSITIVE DRUM FOR IMAGE FORMING APPARATUS AND METHOD THEREOF

CROSS-REFERENCE TO RELATED APPLICATIONS

This application claims the benefit of Korean Application No. 2002-8757, filed Feb. 19, 2002, in the Korean Industrial Property Office, the disclosure of which is incorporated herein by reference.

BACKGROUND OF THE INVENTION

1. Field of the Invention

The present invention relates to an apparatus to fabricate a photosensitive drum for an image forming apparatus, and more particularly, to an apparatus to fabricate a photosensitive drum for an image forming apparatus used in a printer, and a method thereof.

2. Description of the Related Art

In general, an electrophotographic printer such as a laser printer forms a latent electrostatic image on a photosensitive medium, develops the latent electrostatic image with a toner having a predetermined color, and transfers the developed toner image to a printing paper in order to obtain a desired image. The photosensitive medium is typically a photosensitive belt or a photosensitive drum.

FIG. 1 is a view of a portion of an image forming apparatus using a typical photosensitive belt as a photosensitive medium. Referring to FIG. 1, the rotation path of a photosensitive belt 10 that travels a continuous path due to rollers 10*a*, 10*b*, and 10*c* includes an eraser 12, a charger 14, a laser scanning unit (LSU) 16, and a plurality of developing units 18*a*, 18*b*, 18*c*, and 18*d*. The eraser 12 erases charges on the photosensitive belt 10. The charger 14 charges the photosensitive belt 10 with a predetermined electric potential. The LSU 16 radiates light onto the photosensitive belt 10 to form a latent electrostatic image. The plurality of developing units 18*a*, 18*b*, 18*c*, and 18*d* are disposed in series along the travel direction of the photosensitive belt 10 and each develops the latent electrostatic image as a toner image with a different color. The developed toner image is transferred to a transfer belt 20 that circulates in contact with the photosensitive belt 10.

However, in the above-described transfer method, the photosensitive belt 10 may move laterally outside of a transfer range of an image. Thus, a steering unit (not shown) is needed to adjust the photosensitive belt 10.

FIG. 2 is a view of a portion of an image forming apparatus using a photosensitive drum as a photosensitive medium to solve the problems caused by the use of a photosensitive belt. Elements that are the same as those in FIG. 1 are described with the same numerals, and thus their detailed descriptions are omitted.

Referring to FIG. 2, instead of the photosensitive belt 10 of FIG. 1, a large-sized photosensitive drum 30 is used. Thus, the steering unit is not needed. However, a different problem occurr s in the manufacture of the photosensitive drum 30. When the small-sized photosensitive drum 30 having a diameter of 25–32 mm is manufactured, a small-sized rotary drum having a diameter of 25–32 mm is dipped in a container containing a photosensitive solution to form a photosensitive layer on the surface of the rotary drum. In this case, a plurality of small-sized rotary drums are manufactured at the same time, and thus manufacturing costs are low. However, since the photosensitive drum 30 uses a large-sized rotary drum having a diameter of about 150 mm, it is difficult to dip multiple rotary drums in the container containing the photosensitive solution. Also, it is expensive to manufacture the photosensitive drum 30.

SUMMARY OF THE INVENTION

Accordingly, it is an object of the present invention to provide an apparatus to fabricate a photosensitive drum for an image forming apparatus where a photosensitive belt can easily be wound on a rotary drum, and a method thereof.

Additional objects and advantages of the invention will be set forth in part in the description which follows and, in part, will be obvious from the description, or may be learned by practice of the invention.

The foregoing and other objects of the present invention are achieved by providing a apparatus to fabricate a photosensitive drum having a photosensitive belt and a double-sided tape for an image forming apparatus, the apparatus to fabricate including a photosensitive belt supply roll to supply the photosensitive belt; a double-sided tape supply roll to supply the double-sided tape; a bonding unit to bond the photosensitive belt and the double-sided tape together; a cutting unit to cut the bonded photosensitive belt and double-sided tape at a predetermined length to form a double-sided tape cover; a rotating unit to rotate the cut photosensitive belt and double-sided tape around the rotary drum having a predetermined size; and a winding unit to wind the double-sided tape cover to thereby separate the double-sided tape cover from the photosensitive belt and the double-sided tape.

According to an aspect of the present invention, the rotating unit includes a plurality of supporting rollers to rotate underneath the rotary drum to support the rotary drum; a press roller to press the rotary drum, the rotary drum being interposed between the press roller and the supporting rollers and being rotated to rotate the rotary drum, the press roller having a shaft; a pressing unit to push the press roller against the rotary drum, the pressing unit including a connection member connected to the shaft of the press roller; and a moving unit to move the press roller towards and away from the rotary drum to provide a space to load and unload the rotary drum on the supporting rollers.

According to another aspect of the present invention, the pressing unit is a compression spring to press the connection member connected to the shaft of the press roller downward.

According to still another aspect of the present invention, the vertical moving unit is a pneumatic cylinder or an electric cylinder.

According to still another aspect of the present invention, the cutting unit includes a plate to provide a path of the bonded photosensitive belt and double-sided tape; a cutter to cut the bonded photosensitive belt and double-sided tape on the plate; and a cutter-driving unit to move the cutter downward after a predetermined time to separate the photosensitive belt and the double-sided tape from the double-sided tape cover.

The winding unit may include a winding roll to wind the double-sided tape cover, and a motor to rotate the wind roll, and the number of rotations of the motor is controlled.

The foregoing and other advantages of the present invention are also achieved by providing a method of fabricating a photosensitive drum for an image forming apparatus, the method including supplying a photosensitive belt and a double-sided tape, respectively; bonding the supplied photosensitive belt and the double-sided tape together; cutting the bonded photosensitive belt and double-sided tape from a double-sided tape cover, at a predetermined length; pressing and rotating the cut photosensitive belt and double-sided tape on a rotary drum having a predetermined size; and winding the double-sided tape cover which is separated from the photosensitive belt and the double-sided tape.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
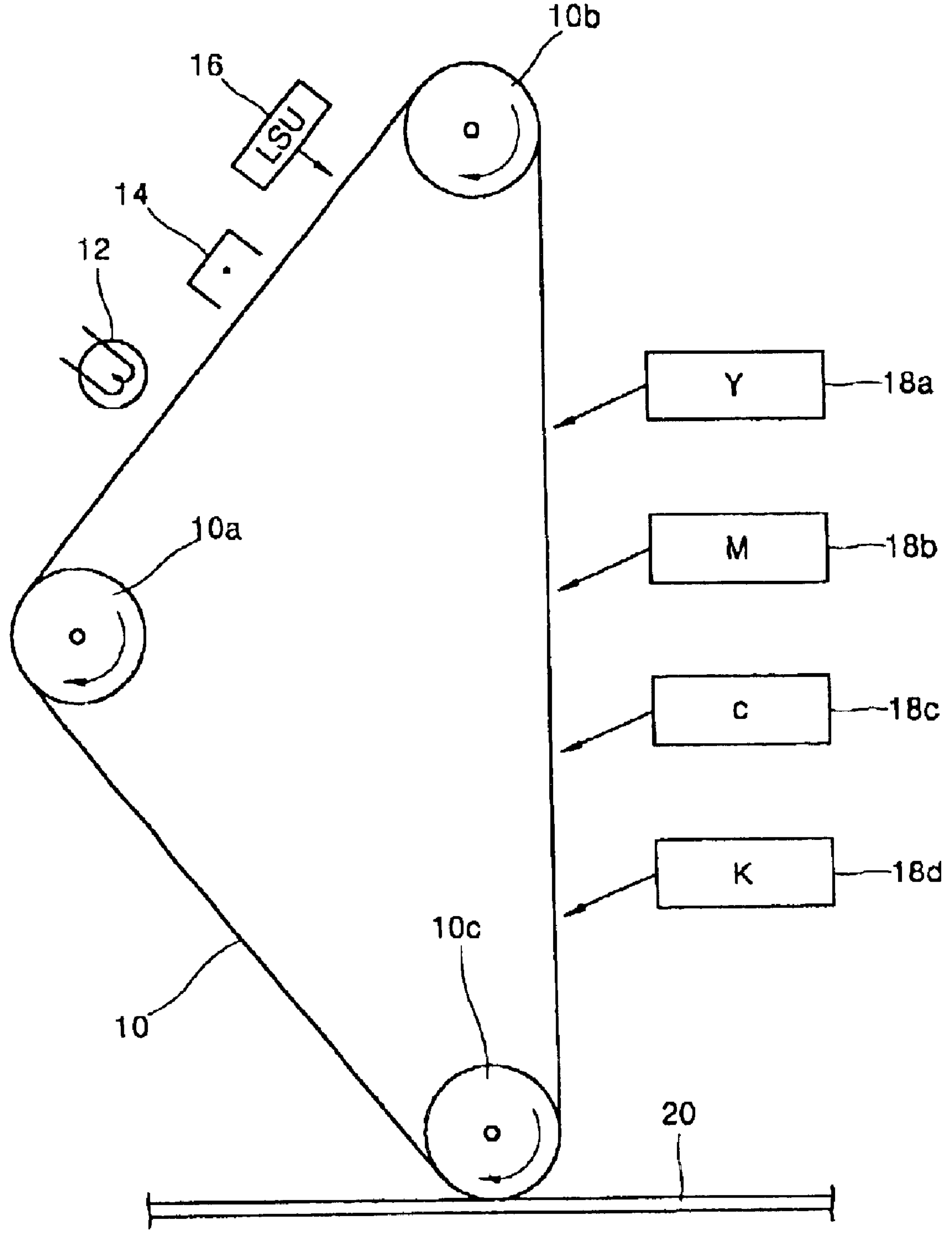
FIG. 1 (PRIOR ART)
FIG. 1 is a view of a portion of an image forming apparatus using a photosensitive belt according to a conventional structure.
Figure 2:
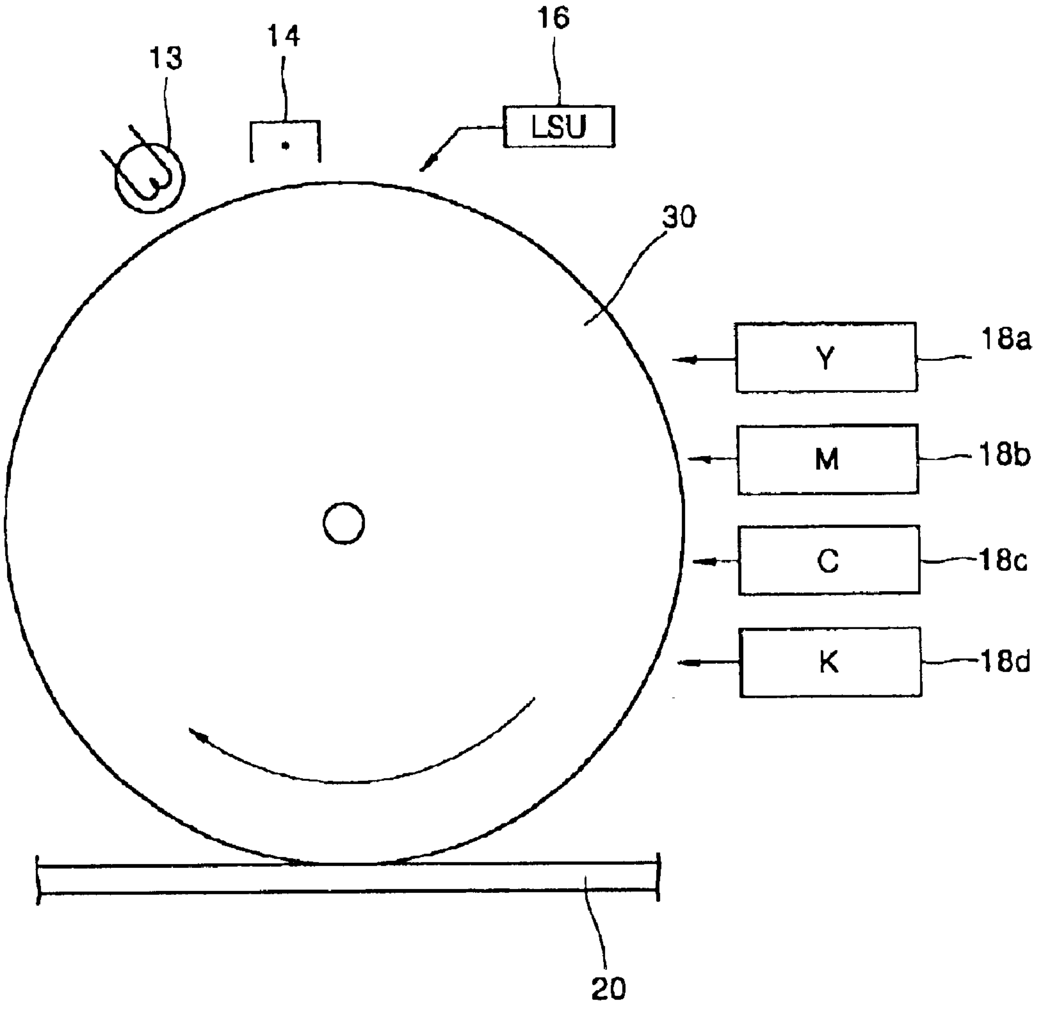
FIG. 2 (PRIOR ART)
FIG. 2 is a view of a portion of an image forming apparatus using a photosensitive drum according to a conventional structure.

Reference will now be made in detail to the present preferred embodiments of the present invention, examples of which are illustrated in the accompanying drawings, wherein like reference numerals refer to like elements throughout.

Figure 3:
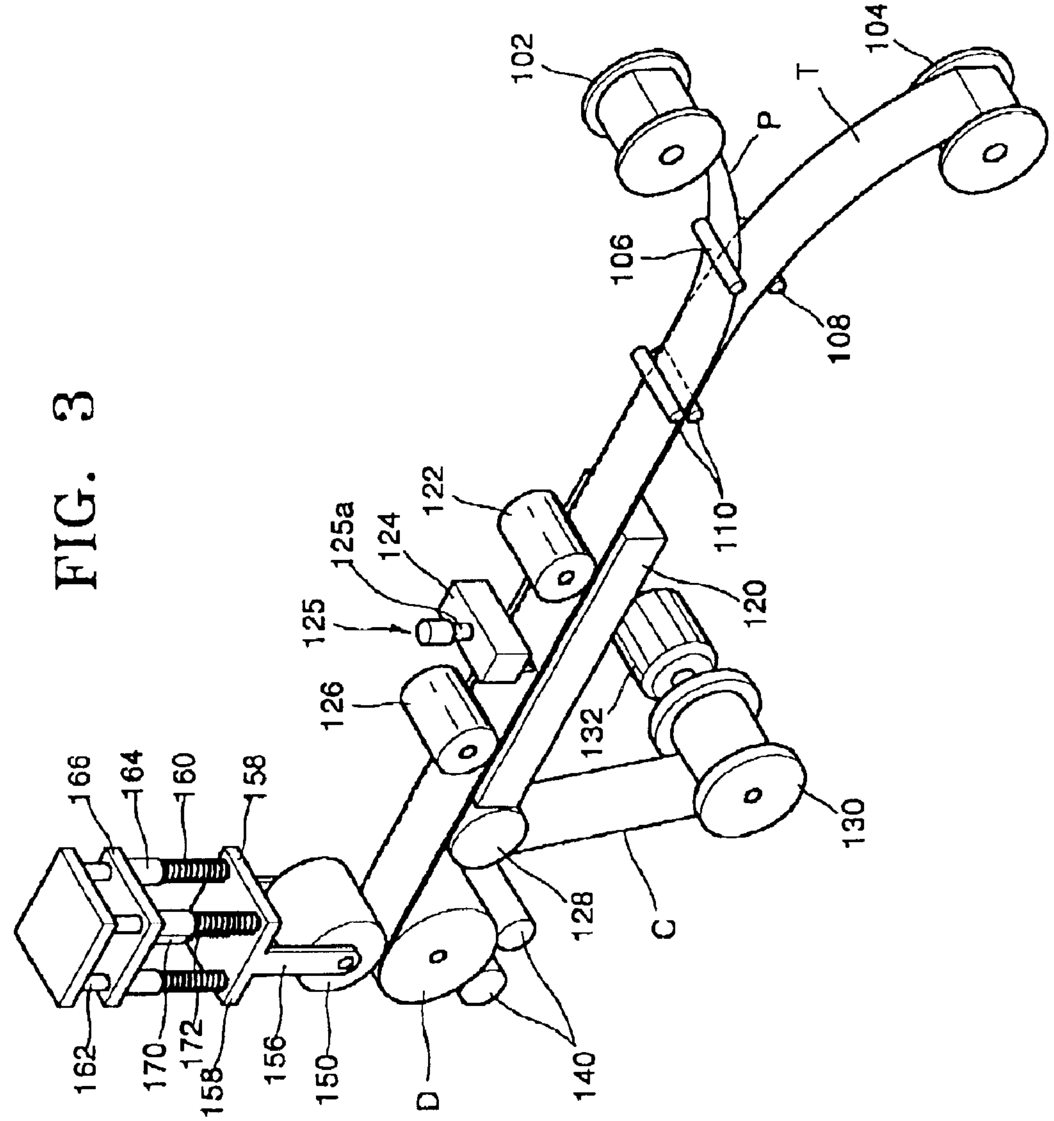
FIG. 3 is a perspective view of an apparatus to fabricate a photosensitive drum for an image forming apparatus according to an embodiment of the present invention.
Figure 4:
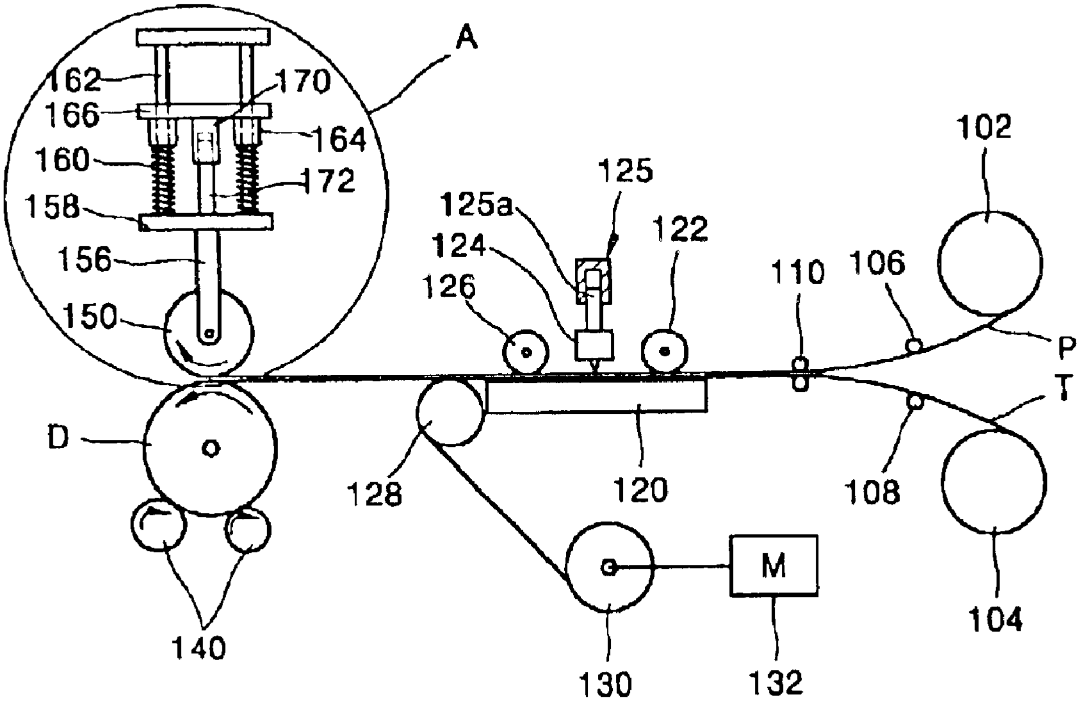
FIG. 4 is a schematic cross-sectional view of the apparatus shown in FIG. 3.

FIG. 3 is a perspective view of an apparatus to fabricate a photosensitive drum for an image forming apparatus according to an embodiment of the present invention. FIG. 4 is a schematic cross-sectional view of the apparatus shown in FIG. 3. For the understanding of the present invention, a photosensitive belt, a double-sided tape, and a rotary drum to fabricate the photosensitive drum are shown with the apparatus to fabricate the photosensitive drum according to the present invention.

Referring to FIGS. 3 and 4, the apparatus to fabricate the photosensitive drum for an image forming apparatus includes a photosensitive belt supply roll 102, a double-sided tape supply roll 104, a bonding unit 110, a cutting unit, a rotating unit, and a winding unit, all of which are described in detail below. Here, the bonding unit 110 bonds a photosensitive belt P supplied from the photosensitive belt supply roll 102 to a double-sided tape T supplied from the double-sided tape supply roll 104. The cutting unit cuts the bonded photosensitive belt P and double-sided tape T to a predetermined length from a double-sided tape cover C. The rotating unit rotates the cut photosensitive belt P and double-sided tape T around a rotary drum D having a predetermined size. The winding unit winds the double-sided tape cover C that is separated from the double-sided tape T and the photosensitive belt P.

The photosensitive belt P is formed of a sequential stack of a base layer, a conductive layer, and a photosensitive layer. When a laser is radiated onto the surface of the photosensitive belt P, electrons of the photosensitive layer pass through the conductive layer to the outside, thereby forming a latent electrostatic image. According to an aspect of the present invention, the photosensitive belt P has a thickness of 50 μm.

The double-sided tape T in which adhesives are formed on both sides of a supporting layer may be a double-sided transfer tape made by 3M Corporation. The transfer tape has a product number of 9640 and a thickness of about 50 μm. The double-sided tape cover C of a thickness of about 100–200 μm made of paper is attached to the bottom surface of the double-sided tape T.

The bonding unit 110 may be a guide slit having a predetermined width. The guide slit 110 bonds the photosensitive belt P and the double-sided tape T together when these elements are bent at a predetermined angle by first and second guide bars 106 and 108 installed between the supply rolls 102 and 104 and the guide slit 110. The photosensitive belt P and the double-sided tape T are bonded together when passing through the guide slit 110 by rotary power of a winding roll 130 to wind the double-sided tape T, as described later.

The cutting unit includes a plate 120, a cutter 124, and a cutter-driving unit (described below). Here, the plate 120 is a path over which the bonded photosensitive belt P and double-sided tape T pass. The cutter 124 cuts the bonded photosensitive belt P and double-sided tape T from the double-sided tape cover C by downward movement toward the plate 120. The cutter-driving unit drives the cutter 124. First and second rotating guides 122 and 126, which guide the bonded photosensitive belt P and double-sided tape T and push these elements close to the plate 120, are installed on the plate 120. The rotating guides 122 and 126 press the upper surface of the photosensitive belt P that is passing over the plate 120 and are rotated by the movement of the photosensitive belt P.

The cutter-driving unit to drive the cutter 124 includes a timer (not shown) to set a predetermined time and a pneumatic cylinder 125 or an electric cylinder to move the cutter 124 downward a predetermined distance after the predetermined time. A rod **125*a*, which is connected to the cutter 124, is positioned underneath the pneumatic cylinder 125. The cutter 124 is positioned over the plate 120, and cuts the photosensitive belt P and the double-sided tape T that are passing under the cutter 124 at each predetermined length, according to the timer, but does not cut the double-sided tape cover C. The photosensitive belt P and the double-sided tape T may each have a thickness of 50 μm. Thus, if the double-sided tape cover C has a thickness of 100–200 μm, the cutter 124 cuts the photosensitive belt P and the double-sided tape T but does not cut the double-sided tape cover C when the cutter 124** moves downward up to a distance of about 125 μm from the photosensitive belt P.

The winding unit to wind the double-sided tape cover C includes a winding roll 130, a motor 132, and a guide roll 128. Here, the winding roll 130 winds the double-sided tape cover C. The motor 132 rotates the winding roll 130. The guide roll 128 rotates in contact with the double-sided tape cover C between the plate 120 and the winding roll 130 so that the winding roll 130 smoothly winds the double-sided tape cover C. The motor 132 has to be controlled to stop after the winding roll 130 rotates a distance corresponding to the length of the photosensitive belt P, which is wound on the rotary drum D. Thus, the number of rotations of the motor 132 is accurately controlled.

The rotating unit includes supporting rollers 140, a press roller 150, a pressing unit, and a vertical moving unit. Here, the supporting rollers 140 rotate underneath the rotary drum D to support the rotary drum D. The press roller 150 is rotated by the rotation of the rotary drum D and presses the rotary drum D. The pressing unit pushes the press roller 150 close to the rotary drum D via a connection member 156 that is connected to a shaft 152 of the press roller 150 (refer to FIG. 5). The vertical moving unit moves the press roller 150 up and down to provide a space to load and unload the rotary drum D on the supporting rollers 140.

Figure 5:
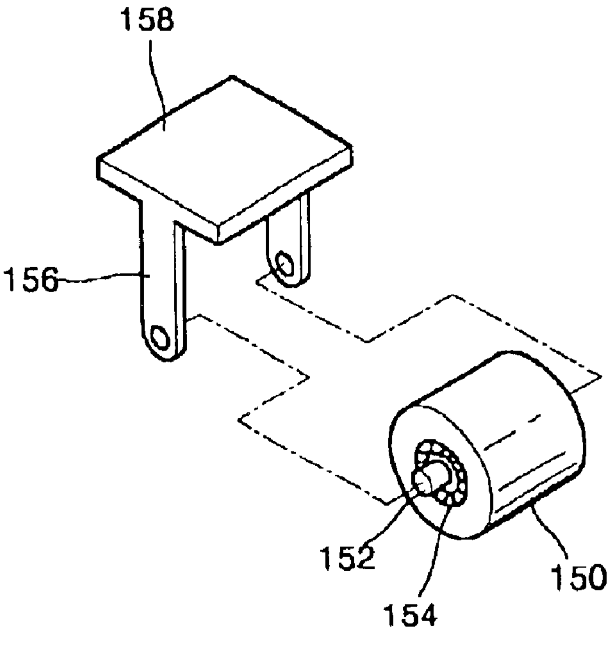
FIG. 5 is an exploded perspective view of an example of a press roller of the apparatus shown in FIG. 3.
Figure 6:
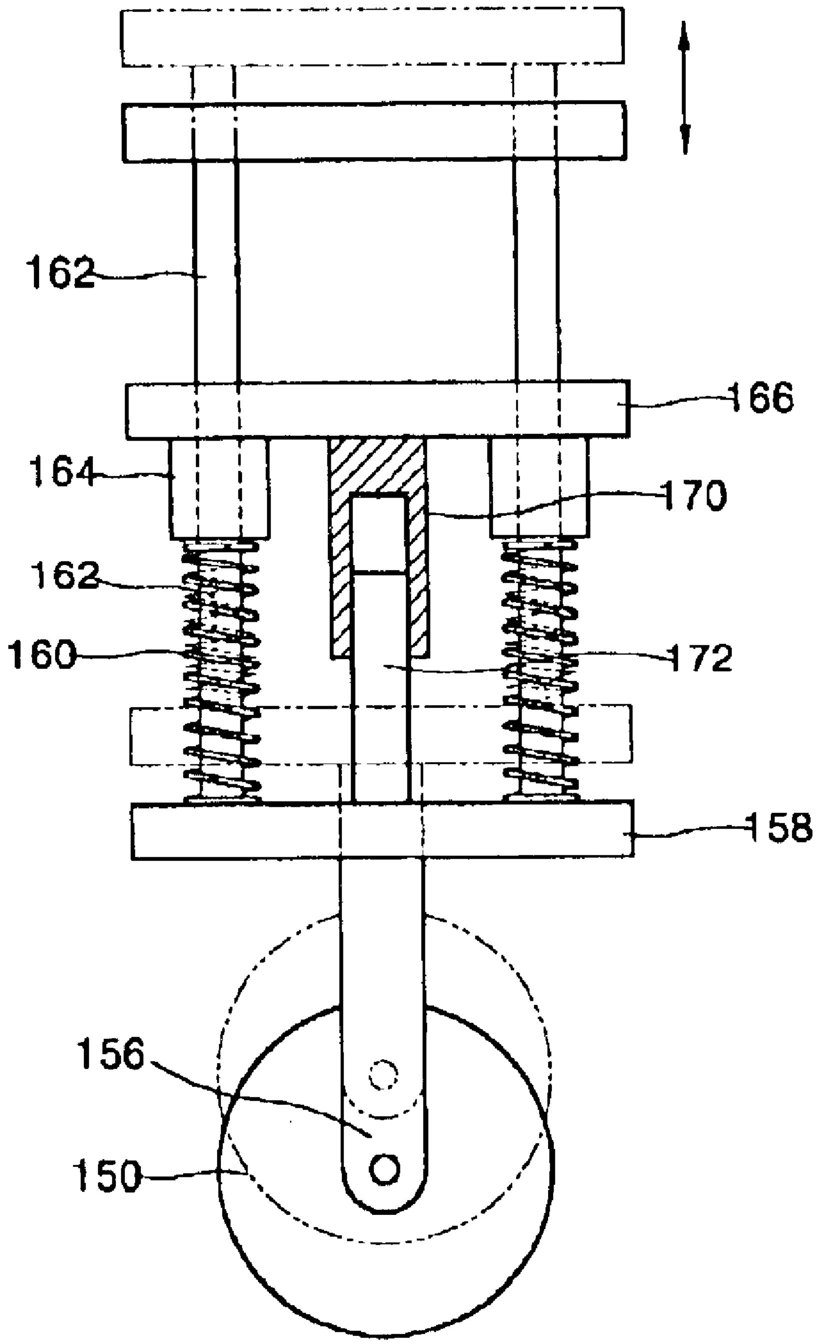
FIG. 6 is an enlarged cross-sectional view of portion 'A' shown in FIG. 4.

The supporting rollers 140 are operated and synchronously rotated by a motor (not shown). FIG. 5 is an exploded perspective view of the press roller 150 and FIG. 6 is an enlarged cross-sectional view of area A of FIG. 4. The shaft 152 and a bearing 154 surrounding the shaft 152 are located in the center of the press roller 150. Both ends of the shaft 152 are connected to a plate 158 via the connecting member 156. Four vertical rods 162 are installed on the plate 158, and each vertical rod 162 penetrates through a corresponding bushing 164. Compression springs 160 are installed around the four vertical rods 162 between the plate 158 and the bushings 164. The bushings 164 are connected to a fixed plate 166. A pneumatic cylinder 170 is positioned underneath the fixed plate 166. One end of a cylinder rod 172 underneath the pneumatic cylinder 170 is fixedly positioned on the plate 158. A dotted line of FIG. 6 shows that the press roller 150 is moved upward. Referring to FIG. 6, the vertical rods 162 move through the bushings 164 upward as the cylinder rod 172 moves upward by the pneumatic cylinder 170 in a state in which the fixed plate 166 is fixed. Thus, the compression springs 160 are displaced to a state of further compression, and the press roller 150 connected to the plate 158 moves upward. The pneumatic cylinder 170 may also be an electric cylinder. The compression springs 160 provide downward elasticity from the fixed plate 166.

The rotary drum D is a cylindrical rotary drum made of aluminium or an aluminium alloy. If the rotary drum D has a diameter of 150 mm, a rotation distance of the winding roll 132 when the motor 132 is driven one time is controlled to be 485 mm. After winding the photosensitive belt P and the double-sided tape T around the rotary drum D one turn, about 13 mm of the photosensitive belt P and the double-sided tape T is left, both ends of which are overlapped to form a joint having a thickness of 6.5 mm.

The cutter 124 cuts the photosensitive belt P every 485 mm, or the one-time rotation distance of the winding roll 130. However, after the apparatus to fabricate the photosensitive drum starts, the photosensitive belt P and the double-sided tape T pass through the cutter 124, move a predetermined distance, and are positioned between the guide roll 128 and the supporting rollers 140. Thus, the cutter 124 moves downward one time, cuts the photosensitive belt P and the double-sided tape T, and returns upward after the photosensitive belt P and the double-sided tape T move a remaining distance in consideration of the distance that has already passed.

In the above-described embodiment, the apparatus to fabricate the photosensitive drum was used to manufacture a photosensitive drum having a large diameter, but can be used to manufacture a photosensitive drum having a diameter of 24–32 mm. The operation of the apparatus to fabricate the photosensitive drum will be described with reference to FIGS. 3 through 6.

The photosensitive belt supply roll 102 and the double-sided tape supply roll 104 are prepared. The rotary drum D, which will be wound by the photosensitive belt P, is placed on the supporting rollers 140. The pneumatic cylinder 170 operates to move the press roller 150 downward so that the press roller 150 contacts the rotary drum D. Here, the compression springs 160 provide elasticity to the press roller 150 so that the press roller 150 presses the rotary drum D. In this embodiment, the press roller 150 applies a pressure of 2–3 kgf to the rotary drum D.

Then, an end of the photosensitive belt P and the double-sided tape T from which the double-sided tape cover C is stripped between the guide roll 128 and the supporting rollers 140 is attached on the rotary drum D. The drive of the supporting rollers 140 and the motor 132 of the winding roll 130 is operated, and concurrently the timer of the pneumatic cylinder 125 driving the cutter 124 is operated. The rotary drum D is pressed by the press roller 150 and the press roller 150 is rotated with the rotation of the supporting rollers 140. As a result, the photosensitive belt P and the double-sided tape T are pressed when passing between the rotary drum D and the press roller 150, and wound on the rotary drum D. The motor 132 rotates the winding roll 130 by a distance that is input in advance, i.e., 485 mm, stripping the double-sided tape cover C from the double-sided tape T and winding the stripped double-sided tape cover C on the winding roll 130, and stops. Due to the rotation of the motor 132 and the supporting rollers 140, the photosensitive belt P and the double-sided tape T are unwound from the photosensitive belt supply roll 102 and the double-sided tape supply roll 104, respectively, past the first and second guide bars 106 and 108, are bent at a predetermined angle, and are bonded to each other by passing into the guide slit 110. The bonded photosensitive belt P and double-sided tape T are pressed on the plate 120 when passing under the rotating guides 122 and 126.

The timer of the pneumatic cylinder 125 is turned on after a predetermined time corresponding to a predetermined distance of movement of the photosensitive belt P due to the driving of the supporting rollers 140 and the motor 132. Then, the pneumatic cylinder 125 operates, the rod 125*a* moves downward, and the cutter 124 cuts the photosensitive belt P and the double-sided tape T, and moves upward to the original position. The cut photosensitive belt P and double-sided tape T move with the rotation of the supporting rollers 140. The double-sided tape cover C that is not cut is wound on the winding roll 130, changing its direction through a portion of the guide roll 128. The photosensitive belt P to which the cut double-sided tape T is attached is in a state to minimally pass an end of the plate 120 when the motor 132 stops.

After the supporting rollers 140 stop, the pneumatic cylinder 170 moves the cylinder rod 172 upward. Here, the plate 158 and the rods 162 connected to the cylinder rod 172 move upward with the rods 162 that pass through the bushings 164. Thus, the press roller 150 is separated upward from the rotary drum D. The rotary drum D, on which the photosensitive belt P is wound, and which is positioned on the supporting rollers 140, is taken out and another rotary drum D is placed on the supporting rollers 140 to repeat the above-described operation.

As described above, according to an apparatus to fabricate a photosensitive drum for an image forming apparatus according to the present invention, an inexpensive photosensitive belt is wound on a large-sized rotary drum by applying tension. Thus, it is possible to mass-produce the photosensitive drum at a low cost.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An apparatus to fabricate a photosensitive drum having a photosensitive belt and a double-sided tape surrounding a rotary drum for an image forming apparatus, the apparatus to fabricate comprising:

a photosensitive belt supply roll to supply the photosensitive belt;

a double-sided tape supply roll to supply the double-sided tape;

a bonding unit to bond the photosensitive belt and the double-sided tape together;

a cutting unit to cut the bonded photosensitive belt and double-sided tape at a predetermined length to form a double-sided tape cover;

a rotating unit to rotate the cut photosensitive belt and double-sided tape around the rotary drum; and a winding unit to wind the double-sided tape cover to thereby separate the double-sided tape cover from the photosensitive belt and the double-sided tape.

2. The apparatus of claim 1, wherein the rotating unit comprises:

a supporting roller to rotate and support the rotary drum; and a press roller to press the rotary drum, the rotary drum being interposed between the press roller and the supporting roller, a moving unit to move the press roller away from and towards the rotary drum to provide a space to respectively load and unload the rotary drum on the supporting roller.

3. The apparatus of claim 2, wherein the press roller is rotated by the rotary drum.

4. The apparatus of claim 2, further comprising a pressing unit to push the press roller against the rotary drum, the pressing unit including a connection member connected to a shaft of the press roller.

5. The apparatus of claim 4, wherein the pressing unit comprises a plurality of compression springs to press the connection member towards the rotary drum.

6. The apparatus of claim 2, further comprising a moving unit to move the press roller away from and towards the rotary drum to provide a space to respectively load and unload the rotary drum on the supporting roller.

7. The apparatus of claim 6, wherein the moving unit is a pneumatic cylinder or an electric cylinder.

8. The apparatus of claim 2, wherein the supporting roller comprises two rollers, and the apparatus further comprising a motor to synchronously rotate the two rollers.

9. The apparatus of claim 1, wherein the cutting unit comprises:

a plate to provide a path of movement of the bonded photosensitive belt and double-sided tape;

a cutter to cut the bonded photosensitive belt and double-sided tape on the plate; and a cutter-driving unit to move the cutter towards the bonded photosensitive belt and double-sided tape after a predetermined time to separate the photosensitive belt and the double-sided tape from the double-sided tape cover.

10. The apparatus of claim 9, wherein the cutter-driving unit comprises:

a timer to determine whether the predetermined time has elapsed; and a moving unit to move the cutter downward towards the bonded photosensitive belt and double-sided tape a predetermined distance after the predetermined time according to the timer, the moving unit being either a pneumatic cylinder or an electric cylinder.

11. The apparatus of claim 9, further comprising a rotating guide to push the photosensitive belt and the double-sided tape close to the plate and to be rotated by the movement of the photosensitive belt and the double-sided tape.

12. The apparatus of claim 9, further comprising a guide roll to contact the double-sided tape cover so that the winding unit smoothly winds the double-sided tape cover.

13. The apparatus of claim 1, wherein the winding unit comprises:

a winding roll to wind the double-sided tape cover; and a motor to rotate the winding roll.

14. The apparatus of claim 13, wherein a number of rotations of the motor is controlled.

15. The apparatus of claim 1, wherein the bonding unit is a guide slit to guide the photosensitive belt and the double-sided tape supplied from the photosensitive belt supply roll and the double-sided tape supply roll, respectively, so that the photosensitive belt and the double-sided tape are bonded together and passed therethrough.

16. A method of fabricating a photosensitive drum for an image forming apparatus, the method comprising:

supplying a photosensitive belt and a double-sided tape;

bonding the supplied photosensitive belt and the double-sided tape together;

cutting the bonded photosensitive belt and double-sided tape from a double-sided tape cover, at a predetermined length;

separating the photosensitive belt and double-sided tape from the double-sided tape cover comprising pressing and rotating the cut photosensitive belt and double-sided tape on a rotary drum having a predetermined size; and winding the separated double-sided tape cover.

17. The method of claim 16, wherein the cutting comprises driving a cutter, which is installed over a plate to provide a path of the bonded photosensitive belt and double-sided tape, toward the photosensitive belt and double-sided tape.

18. The method of claim 17, wherein the driving is performed by a pneumatic cylinder or an electric cylinder which moves the cutter a predetermined distance after a predetermined time.

19. The method of claim 16, wherein the pressing and rotating comprises:

supporting the rotary drum with a supporting roller; and rotating a press roller to thereby push the rotating drum.

20. The method of claim 19, wherein the supporting roller comprises two rollers, the method further comprising synchronously rotating the two rollers with a motor.

21. The method of claim 19, further comprising pressing the press roller downward with compression springs.

22. The method of claim 16, wherein the winding comprises driving a motor to rotate a winding roll which winds the double-sided tape cover, wherein a number of rotations of the motor is controlled to rotate the winding roll a predetermined rotation distance.

* * * * *

UNITED STATES PATENT AND TRADEMARK OFFICE

CERTIFICATE OF CORRECTION

PATENT NO. : 6,818,088 B2
DATED : November 16, 2004
INVENTOR(S) : Jin-Soo Lee

It is certified that error appears in the above-identified patent and that said Letters Patent is hereby corrected as shown below:

Column 7,
Line 30, after "roller" change "." to -- , --

Signed and Sealed this

Tenth Day of May, 2005

JON W. DUDAS
*Director of the United States Patent and Trademark Office*